Aug. 28, 1951  T. E. TORKELSON  2,566,261
CLUTCH MECHANISM

Filed Aug. 31, 1948  3 Sheets-Sheet 1

INVENTOR.
TORKEL E. TORKELSON
BY
Mellin and Hanscom
ATTORNEYS

Aug. 28, 1951　　　T. E. TORKELSON　　　2,566,261
CLUTCH MECHANISM

Filed Aug. 31, 1948　　　　　　　　　　3 Sheets-Sheet 2

INVENTOR.
TORKEL E. TORKELSON
BY
Mellin and Hanscom
ATTORNEYS

Aug. 28, 1951     T. E. TORKELSON     2,566,261
CLUTCH MECHANISM
Filed Aug. 31, 1948     3 Sheets-Sheet 3
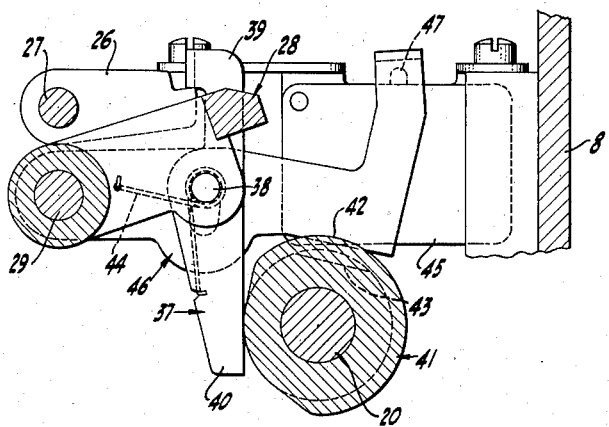
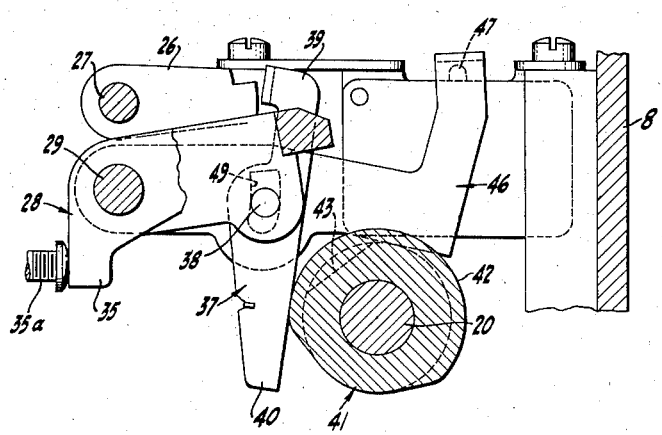
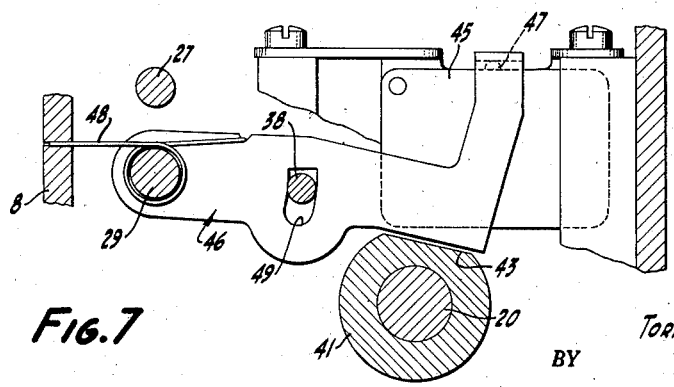
INVENTOR.
TORKEL E. TORKELSON
BY
ATTORNEYS Patented Aug. 28, 1951

2,566,261

UNITED STATES PATENT OFFICE 2,566,261

CLUTCH MECHANISM

Torkel E. Torkelson, Baldwin, N. Y., assignor to The McBee Company, Athens, Ohio, a corporation of Ohio Application August 31, 1948, Serial No. 47,005

4 Claims. (Cl. 192—.02)

1

This invention relates to clutch mechanisms, particularly of the type used in business machines to effect a drive between a driving motor and the operating mechanism of the machine.

The present invention is principally concerned with a clutch mechanism of the type which, when engaged, carries a driven mechanism through a precise cycle of operation, at the end of which it automatically disengages in a condition for a successive engagement and operation, and it is the principal object of my present invention to provide an improved and simplified clutch and drive mechanism of the character referred to which is positive, accurate and efficient in operation.

One form which the invention may assume is exemplified in the following description and illustrated by way of example in the accompanying drawings, in which:

Figs. 4 and 5 are transverse sectional views taken on line IV—IV of Fig. 1, showing the tripping mechanism in two different positions.

Fig. 6 is a transverse sectional view taken on line VI—VI of Fig. 1, showing the switch actuating machanism.

Fig. 7 is a plan sectional view taken on line VII—VII of Fig. 2, showing the operating mechanism for the switch.

Figure 1:
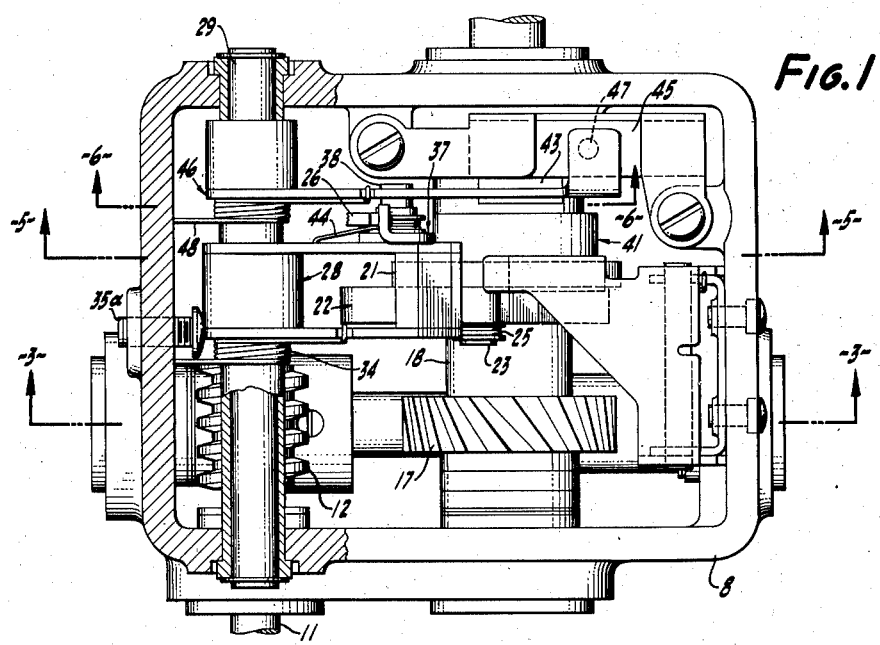
Fig. 1 is a view in elevation of a clutch and drive mechanism embodying the preferred form of my invention, partly in plan section.
Figure 2:
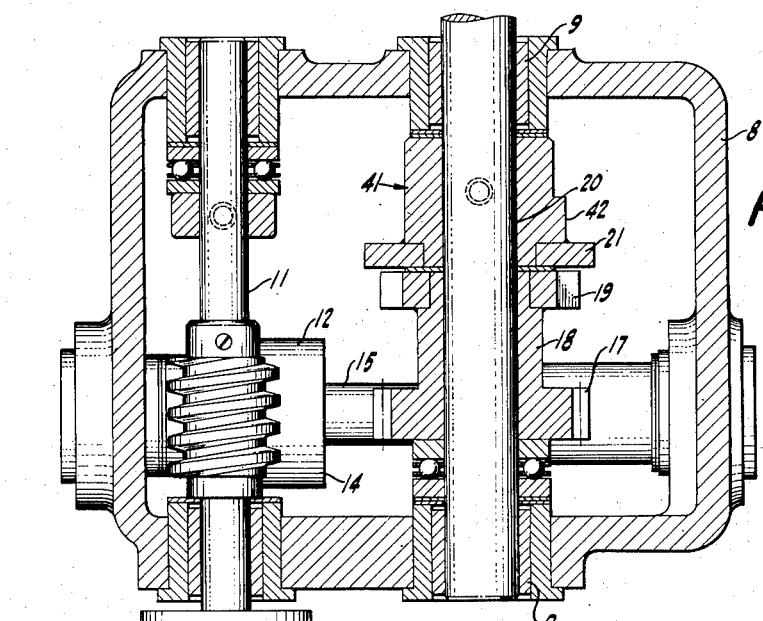
Figs. 2 and 3 are transverse sectional views taken on line II—II of Fig. 1, showing the mechanism when the clutch is in disengaged and engaged condition.
Figure 3:
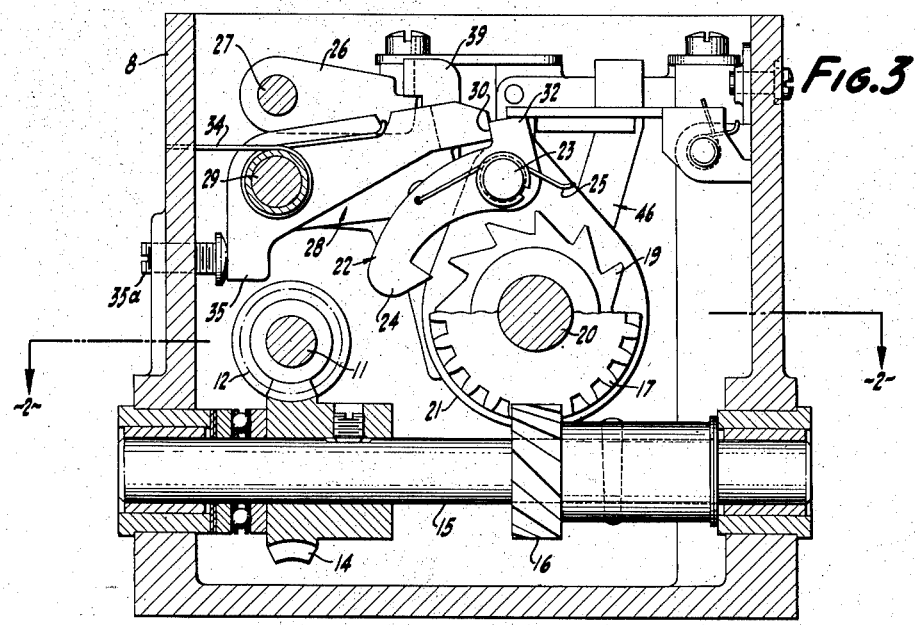
Figure 4:
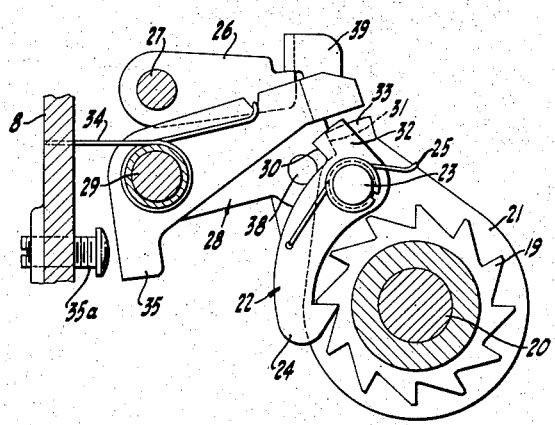

The clutch and drive mechanism comprises an electric motor 10 having a motor shaft 11 which is the driving shaft. This shaft is fitted with a worm 12 meshing with a worm gear 14 fixed on a countershaft 15. This, of course, considerably reduces the speed of the countershaft 15 relative to the motor speed.

Also fixed on the countershaft 15 is a gear 16 in constant mesh with a gear 17 fixed on a sleeve shaft 18. On this sleeve shaft 18 is also fixed a ratchet gear or clutch element 19. Therefore, when the motor 10 is in operation, a drive will be transmitted from the motor shaft 11 through the worm 12 to the worm gear 14 and consequently to the countershaft 15. From this shaft 15 the drive will be transmitted through the gears 16 and 17 and the sleeve shaft 18 to the ratchet gear or driving clutch member 19. The final drive is transmitted from this driving clutch member 19 to a driven shaft 20 as will be described.

It will be seen that the sleeve shaft 18 is rotatably mounted on the driven shaft 20 which is suitably journaled in bearings 9 in the clutch housing 8. The motor shaft 11 and the countershaft 15 are also journaled in suitable bearings in the clutch housing 8, as illustrated.

For clutching the driving clutch member or ratchet gear 19 to the driven shaft 20, there is provided a driven clutch member 21 fixed on the driven shaft 20 in juxtaposition to the ratchet gear 19. A clutch pawl 22 is pivotally mounted on this driven clutch member 21 at an eccentric point 23 thereon exteriorly of the periphery of the ratchet gear 19. The engaging end 24 of this clutch pawl 22 is constantly urged radially inward with respect to the ratchet gear 19 to engage the teeth of the ratchet gear 19 by means of a spring 25. When such engagement is effected, the driving and driven members 19 and 21 clutch the sleeve shaft 18 to the driven shaft 20 completing a drive to the latter from the motor 10.

For engaging the clutch and effecting the drive, an actuator lever 26 is provided which is fixed upon an oscillatory actuator shaft 27. This actuator lever 26 cooperates with an oscillatory clutch lever 28 to effect engagement of the clutch upon actuation of the actuator shaft 27. The clutch lever 28 is pivotal at one end on a shaft 29 mounted in the housing 8. Normally, the clutch lever 28 is positioned substantially tangentially to the circular path of travel of the clutch pawl 22 and its free end is adapted to abut against the radial faces 30 and 31 of radial (with respect to the axis of rotation of members 19 and 21) lugs 32 and 33 projecting radially outward from the clutch pawl 22 and the driven clutch member 21. These lugs 32 and 33 are similarly formed and radially located and are in register when engaged by the end of the lever 28. When the lugs 32 and 33 are so engaged and in register, the clutch pawl 22 is out of engagement with the ratchet gear 19. The clutch lever 28 is normally held positioned to engage the lugs 32 and 33 by means of a spring 34.

Engagement of an angular projection 35 on the lever 28 with an adjustable stop member 35a on the housing 8 limits the movement of the free or engaging end of the clutch lever 28 radially inward with respect to the axis of the driven clutch member 21.

To actuate the clutch lever by means of the actuator lever 26 and its shaft 27, there is provided a trip lever 37 which extends substantially at right angles to the lever 28 and is pivotally connected intermediate its ends to the clutch lever 28 at a point 38 adjacent the free end of the latter. The outer end 39 of the trip lever 37 is formed to be engaged by one side of the free end of the actuator lever 26. The other, or inner, end 40 of the trip lever 37 extends into engagement with the periphery of a two-faced cam 41, the cam faces being indicated by 42 and 43. The end 40 of the lever 37 registers with the cam face 42, as shown. A spring 44 is provided to urge the end 40 radially inward with respect to the cam 41. Normally, this position maintains the end 39 of trip lever 37 engaged with and in the path of travel of the actuator lever 26. However, when the rise of cam face 42 engages the end 40 of the trip lever 37 and is moved about its pivot 38, the end 39 thereof is positioned out of engagement and path of travel of the actuator lever 26, as illustrated. This enables and insures the return of the clutch lever 28 to clutch releasing position, regardless of the position of the actuator lever 26.

It is intended in the present instance that the circuit of the motor be closed almost immediately that the clutch is engaged and to open such circuit when the driven shaft 20 has completed its cycle. It should be pointed out, however, that the present clutch is also useful with a constantly operating motor.

To effect the above result, a micro type of switch 45 is mounted in the housing 8. A switch lever 46 is provided and is pivoted at one end on the shaft 29. The other end is in abutting register with the switch button 47. A spring 48 normally positions the switch lever 46 to maintain the button 47 in a position holding the switch open. The switch lever 46 registers with the cam face 43 and during the open period the cam contour permits the lever 46 to assume the position described to depress the button 47 to open the switch.

However, when the actuator lever is operated to engage the clutch by pivoting the clutch lever 28 through the trip lever 37, the actuation of the clutch lever 28 moves the switch lever 46 to a position releasing the button 47 to close the switch. This is accomplished by engagement of the pivot pin 38 (which connects the trip lever 37 to the clutch lever 28) secured in the lever 28 with a slot 49 in the switch lever 46, as shown. The switch will be maintained closed until the low point of the cam face 43 again registers with the switch lever 46 and permits the lever 46 to open the switch by depressing the button 47.

In operation, assuming that the clutch is in non-engaged condition and the motor circuit is opened, to operate the driven shaft 20 through its cycle of operation, which is, in this instance, one complete revolution, it is only necessary to turn the actuator shaft 27. This swings the actuator lever 26 in a direction moving the free end of clutch lever 28 out of register and engagement with the lugs 32 and 33 on the pawl 22 and driven clutch part 21. This releases the pawl 22 so it may be swung by its spring 25 into engagement with the ratchet gear or driving clutch member 19. During its disengaging movement, the lever 28 through the pin 38 moves the switch lever 46 to switch closing position, causing closing of the motor circuit and operation of the motor 10.

The drive thus effected from the motor 10 and its shaft 11 will be transmitted to the driven shaft 20 through the clutch members 19 and 21 until the shaft 20 has revolved one revolution.

At this point the cam face 42 will have engaged the end 40 of lever 37 and permitted the spring 34 to return the end of the clutch lever inwardly toward the periphery (to an extent permitted by members 35 and 35a) of the driven clutch member 21 in position to engage the lugs 32 and 33, regardless of the position of the actuator lever 26. If the latter returns to starting condition later, it moves the lever end 39 sufficiently to by-pass it and assume starting position.

As the shaft 20 reaches the end of its cycle, the end of the clutch lever 28 engages the lug 32 on the clutch pawl and disengages the latter from the ratchet gear 19. It then engages the lug 33 and stops the revolution of the shaft 20 at exactly one revolution.

Simultaneously, the low point on cam face 43 registers with the switch lever 46 and permits its spring to operate it to open the switch 45 of the motor circuit, as described.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is—

1. A clutch mechanism comprising driving and driven shafts, complemental clutch members operable to provide a driving connection therebetween and including a pivotal clutch member secured to the driven shaft and resiliently urged to clutch engaging position, a clutch release member pivotally supported and resiliently urged to a position engaging said pivotal clutch member and pivoting the same out of clutch engaging position, a lever pivotally supported by said clutch release member and having first and second arms, a manually operable lever engageable with the first arm and operable to pivot said clutch release member out of engagement with said pivotal clutch member, and a rotary cam rotated by one of said shafts, engageable with the second of said arms and operable to release said first arm from engagement with said manually operable lever when said shaft is in a predetermined rotary position.

2. A clutch mechanism comprising driving and driven shafts, complemental clutch members operable to provide a driving connection therebetween and including a driven clutch member having a body portion secured to said driven shaft and a pawl pivotally supported by said body portion and resiliently urged into clutch engaging position, a clutch release member pivotally supported and resiliently urged to a position engaging said pawl to pivot the same out of clutch engaging position and also engaging said body portion to halt further movement of said driven shaft, a lever pivotally supported by said clutch release member and having first and second arms, a manually operable lever engageable with the first arm and operable to pivot said clutch release member out of engagement with said pawl, and a rotary cam secured to said driven shaft, engageable with the second of said arms and operable to release said first arm from engagement with said manually operable lever when said shaft is in a predetermined rotary position.

3. A single revolution clutch comprising driving and driven shafts, driving and driven clutch members, said driven clutch member including a body portion secured to the driven shaft and a pawl pivotally and eccentrically secured to said body portion and resiliently urged into engagement with said driving clutch member, a clutch release member supported for pivotal movement and resiliently urged to a position engaging said pawl to disengage the same from said driving clutch member and to arrest further movement of the driven shaft, a pivotal member supported upon said clutch release member, resiliently urged to a predetermined pivotal position and having first and second arms, a manually operable lever operable to engage said first arm and thereby pivot said clutch release member out of engagement with said pawl, and a rotary cam engaging said second arm and rotated by said driven shaft, said cam being operable upon completion of one revolution of said driven shaft to pivot said lever so as to disengage said first arm from said manually operable lever.

4. A machine of the character described, comprising a motor having a motor circuit, a driving shaft driven by the motor, a driven shaft, pawl and ratchet means providing a driving connection between said shafts, said pawl being supported by said driven shaft and being resiliently urged to clutch engaging position, a clutch release member pivotally supported and resiliently urged to a position engaging said pawl, pivoting the same out of clutch engaging position and arresting further movement of said driven shaft, manually operable means for actuating said clutch release member including a pivotal member pivotally supported by said clutch release member and a manually operable lever engageable with said pivotal member to pivot said clutch release member out of engagement with said pawl, a rotary cam secured to said driven shaft, engaging said pivotal member and operable in a predetermined rotary position to pivot said pivotal member out of engagement with said manually operable lever, a switch operable to open and close said motor circuit, a pivotal arm operable to open and close said switch, means interconnecting said arm with said clutch release member operable to pivot said arm to close said switch when said clutch members are engaged, and means interconnecting said arm and said rotary cam operable to pivot said arm to open said switch when said clutch members are disengaged.

TORKEL E. TORKELSON.

REFERENCES CITED

The following references are of record in the file of this patent:

UNITED STATES PATENTS

| Number | Name | Date |
| --- | --- | --- |
| 1,737,907 | Arnold | Dec. 3, 1929 |
| 1,825,418 | Pfeiffer | Sept. 29, 1937 |
| 1,935,851 | Lerch | Nov. 21, 1933 |
| 2,229,339 | Payne | Jan. 21, 1941 |
| 2,347,425 | Mageoch | Apr. 25, 1944 |
| 2,370,730 | Hopping | Mar. 6, 1945 |